United States Patent [19]
Kern

[11] 3,800,874
[45] Apr. 2, 1974

[54] HIGH PRESSURE GAS-CARBONATED WATER MISCIBLE DISPLACEMENT PROCESS

[75] Inventor: Loyd R. Kern, Irving, Tex.

[73] Assignee: Atlantic Richfield Company, New York, N.Y.

[22] Filed: Jan. 22, 1973

[21] Appl. No.: 325,381

[52] U.S. Cl.................................. 166/274, 166/273
[51] Int. Cl............................................ E21b 43/22
[58] Field of Search................... 166/274, 273, 268

[56] References Cited
UNITED STATES PATENTS

| | | | |
|---|---|---|---|
| 2,875,831 | 3/1959 | Martin et al. | 166/274 X |
| 3,084,743 | 4/1963 | West et al. | 166/274 X |
| 3,096,821 | 7/1963 | Dyes | 166/273 |
| 3,135,326 | 6/1964 | Santee | 166/273 X |
| 3,138,204 | 6/1964 | Richardson | 166/273 X |
| 3,227,210 | 1/1966 | Trantham | 166/273 X |
| 3,342,256 | 9/1967 | Bernard et al. | 166/274 X |
| 3,620,304 | 11/1971 | Hearn et al. | 166/274 |
| 3,623,552 | 11/1971 | Vairogs | 166/274 |

*Primary Examiner*—Stephen J. Novosad

[57] ABSTRACT

Reservoir oil is produced by a quasi high pressure gas — miscible solvent flood process. Immiscible carbonated water flow through the reservoir in essentially a single phase at an appropriate concentration and pressure leaves a widespread, fairly uniform distribution of carbonated residual oil which acts as a quasi solvent material. Subsequently, a fluid containing a gaseous phase is injected at a miscible pressure below the pressure at which the gas would have built miscibility with the reservoir oil prior to carbonation but high enough to possibly create by multiple contacts a zone miscible with the carbonated residual oil. The created miscible zone banks up the carbonated residual oil into a quasi miscible solvent flood bank. Preferably, the highest pressure exerted on the carbonated water will be equal to or greater than the miscible pressure of the gas, and the injection pressure of the gas will be at least 200 psi higher than highest injection pressure exerted on the carbonated water. An aqueous phase, part of which may be carbonated water, may be used with the miscible gas for mobility and other controls. In the process, the quasi solvent material is generated in place with the mobility and uniform sweep advantages of carbonated water, and the high pressure type of miscibility is created at a lower than normal pressure and banks up a carbonated oil solvent bank thereby providing some of the advantages of the miscible solvent flood process.

24 Claims, No Drawings

HIGH PRESSURE GAS-CARBONATED WATER MISCIBLE DISPLACEMENT PROCESS

BACKGROUND OF THE INVENTION

This invention relates to a displacing process for recovering oil from a subterranean reservoir. More specifically, a high pressure gas type of miscible displacing process and carbonated water are combined to generate a quasi high pressure gas-miscible slug process retaining some of the advantages and overcoming some of the disadvantages of both a high pressure gas process and a solvent slug process.

The production of oil is enhanced by various displacement techniques which are generally classified as miscible and immiscible and which may be conducted at any time during an oil recovery program. In these displacement techniques, the force of an injected fluid propels oil within the formation toward a producing well or horizon. One type of immiscible displacement process involves flooding the reservoir with carbonated water. Three types of miscible displacements are the solvent or miscible slug or flood process, the enriched gas or condensing gas process, and the high pressure gas process.

Water drive or waterflooding is the most widely used displacement technique. It has been proposed to use carbonated water instead of water. The carbonated water process is classified as an immiscible displacement process, and oil recovery depends on the energy of the water with some increase in oil recovery due to oil swelling caused by transfer of carbon dioxide from the carbonated water to the oil. It is generally assumed that recovery obtainable with the use of water or carbonated water is limited and much of the oil originally contained in the reservoir is left in the reservoir. The oil left in the reservoir is residual to the type of immiscible flood process.

In order to increase oil recovery above that which is obtained by immiscible processes in some reservoirs, a variety of miscible recovery processes have been disclosed. It is possible for miscible fluids to displace substantially all of the oil from the part of the reservoir swept or contacted by the miscible fluid. In general, these processes may be considered as a variation of either the enriched or condensing gas process, the solvent flood process, or the high pressure gas process.

In the miscible flood process, a bank or slug of solvent fluid is injected at a pressure, for example, 1000 psi and greater, such that at reservoir conditions the slug material will either be miscible upon first contact or will quickly develop a miscible-like zone with the in place oil. In this technique, the solvent is injected as a relatively narrow transitional displacing phase between oil and a drive fluid. Solvents include hydrocarbon types, for example, propane and butane, non-hydrocarbon types, for example, carbon dioxide, and mixtures or solutions thereof. Other materials may be employed to provide a combination slug. Water and other additives have also been combined or alternately injected with a solvent-like material to partially influence unit displacement of the slug of solvent. When the solvent is mixed with water, the process is still a miscible flood process in that the solvent acts as a distinct phase of the mixture. The relatively narrow band of solvent is displaced by such fluids as water, miscible and immiscible gases and mixtures thereof. In addition to economic factors, there are serious problems involved in the miscible slug process. Unless an expensively large solvent slug is used, it is difficult to form and maintain a uniform flood front of sufficient thickness and breadth to prevent loss of depletion of the band or bank of solvent. If the solvent band is broken or depleted, miscibility is lost, and an immiscible drive results and cannot be reestablished unless an additional solvent band is injected.

A high pressure gas process uses a highly volatile gaseous material which is less soluble in oil or requires a higher pressure to develop miscibility than the solvents used in miscible flood processes. In the high pressure gas process, a gas, for example, methane or flue gas, is injected at a pressure at which the gas will build or create miscibility with the oil by multiple contacts. The gas contacts oil and is enriched. The enriched gas, being less viscous than the oil and not yet miscible with it, moves forward more rapidly than the oil just contacted into contact with fresh oil to be further enriched. This enriching or multiple contact process continues until a miscible transition zone is formed between the oil and the injected gas. The leading edge of this zone is substantially miscible with the oil except possibly for some relatively small precipitated heavy oil phase. The trailing edge of the zone is miscible with the injected gas. Inside the zone, all contiguous fluids are miscible at their leading and trailing edges. In many cases, the high pressure gas mechanism requires a pressure greater than the reservoir will withstand. This may be caused by the properties of the reservoir oil or by the nature of the formation. In addition, it is often impractical or undesirably costly to obtain and maintain these high pressures. In many reservoirs, these high pressures also adversely affect sweep efficiency.

In any displacing process, depending on the reservoir, one or more problems may result from such factors as gravity segregation, viscous fingering, reservoir stratification and the like. In horizontal (nonvertical) displacements, such factors affect both the horizontal (areal sweep) and vertical sweep. These factors especially influence the miscible slug process and the high pressure gas process. It is standard practice to employ laboratory testing and reservoir data to establish and start a recovery program. The recovery program may later be modified to overcome problems as they arise without departing from the original concepts of the recovery program. Tests concerning high pressure gas displacements are frequently subject to uncertainties especially as to the minimum pressure required to create a miscible zone and to problems involving deasphalting or leaving some high molecular weight components in the test core.

It would be desirable to provide a frugal, timely, and reliable recovery process with improved sweep efficiency and which is conducted at a pressure lower than required for a high pressure gas miscible process using the same relatively inexpensive high pressure gas displacing material and which permits use of less solvent-like material and is less critical or has greater tolerance than the process would otherwise have.

SUMMARY OF THE INVENTION

A high pressure gas type of miscible displacing process and carbonated water in essentially a single phase are combined to generate a quasi high pressure gas-miscible flood process wherein the miscible solvent is carbonated oil. A carbonated water solution is forced through the reservoir to contact oil under conditions such that a substantial amount of carbonated oil is left in the area swept by the carbonated water. The high sweep efficiency of the carbonated water and the amount of carbonated water are such that a reasonably uniform widespread zone of this carbonated residual oil is created. Thereafter, a fluid containing a gaseous phase is injected under conditions such that the gaseous phase is able to bank up a zone of carbonated oil ahead of it and miscibly sweep a portion of the reservoir at a pressure lower than the pressure at which the gaseous phase is miscible with the original reservoir oil. The carbonated oil bank thereby acts like a quasi miscible solvent slug and allows the displacement process to be conducted at the lower pressure.

This displacing process has the advantages of miscible displacement not found in immiscible processes, such as water-flooding, low pressure gas and carbonated waterflooding. This process enables use of the high pressure gas mechanism at a lower pressure than when the same type of high pressure gas type of displacing material is used and permits use of less carbon dioxide than is normally used in a miscible flood process using carbon dioxide as the solvent. The size of the quasi solvent carbonated oil bank and uniform spread or placement of the carbonated oil are improved while providing for better control of such factors as gravity segregation, viscous fingering, reservoir stratification and sweep efficiency. The process is especially advantageous for tertiary recovery of oil, for example, oil left in a reservoir after the reservoir has been swept with water. The process of this invention is also especially advantageous for lower pressure reservoirs. Such reservoirs are frequently at a pressure much lower than the pressure at which a miscible high pressure gas process is conducted, and it is necessary to repressure the reservoir before initiating the miscible gas process. Repressurization with a gas is frequently time consuming and impractical. Repressurization with water has been frequently suggested; however, repressuring with water is time consuming and may be inefficient or too costly. In this invention, carbonated water could be used both for repressurization and for the other objectives of this invention, thereby accomplishing dual results and increasing process efficiency.

The process of this invention also provides a frugal use of carbon dioxide. For example, it is generally believed that a set amount of carbon dioxide dissolved in water to provide a carbonated waterflood process will provide much less oil recovery than the same amount of carbon dioxide used as a solvent band in a carbon dioxide miscible flood process. But when the carbonated water is used in a manner herein provided in combination with a modified high pressure gas mechanism, a lesser amount of carbon dioxide can provide the same or a greater amount of oil recovery than a greater amount of carbon dioxide when used in a carbon dioxide miscible flood process.

DETAILED DESCRIPTION OF THE INVENTION

The method of this invention involves a multiple stage process to recover oil from a subterranean reservoir wherein there is at least one injection point and one production point which are spaced apart one from the other. Access to the injection and producing points will be through wellbores, and the points may be spaced laterally, vertically, or diagonally from each other in any pattern or multiple pattern and on any appropriate spacing.

One stage of the method centers on in situ generation of a quasi solvent material comprised of residual carbonated oil which is formed by transfer of carbon dioxide from carbonated water into a residual oil phase and by subsequent injection of a fluid containing a gaseous phase which at an appropriate pressure collects and banks up the carbonated residual oil phase. The carbonated residual oil phase is generated in situ in a manner which improves sweep and uniform distribution of the solvent-like carbonated oil material by injecting into at least one injection point water and carbon dioxide in a ratio, at a bottomhole pressure, and in a manner such that a carbonated water solution is forced through at least a portion of the reservoir between the injection and producing points for the primary purpose of immiscibly sweeping the reservoir, contacting and bypassing oil in the reservoir, and leaving in the swept portion of the reservoir a quasi solvent zone of residual oil which is greatly enriched in carbon dioxide. As a secondary purpose, the carbonated water may be used to raise the pressure of the reservoir to a desired pressure for increasing the concentration of carbon dioxide in the carbonated residual oil phase and for carrying out the remainder of the process. The concentration of carbon dioxide in the oil phase residual to immiscible passage of carbonated water is primarily dependent upon the concentration of carbon dioxide in the carbonated water solution, the amount of residual oil in the area the carbonated water solution, the pressure of the carbonated water solution, and until equilibrium is reached or the residual oil is saturated with carbon dioxide, the volume of carbonated water solution injected at a given carbon dioxide concentration. Of course, as long as the sweep pattern is expanding, some residual oil at the fringe of the sweep pattern will never be saturated.

Widespread uniform placement of the quasi solvent material or carbonated residual oil enhances the displacement efficiency of a gaseous phase injected after the carbonated water and lowers the pressure at which the gaseous phase may miscibly displace oil in the reservoir. The gas in this gaseous phase is characterized by the fact that it is capable at the reservoir temperature of creating at a first miscible pressure a zone substantially miscible with the reservoir oil except possibly some relatively small separated or precipitated phase of the oil. The pressure at which a gas will build miscibility with an oil by multiple contacts as previously mentioned is subject to experimental variation. Therefore, as used herein, this first miscible pressure is the lowest, reasonably certain pressure at which the gas will build miscibility with the reservoir oil at the reservoir temperature. The gas in the gaseous phase is also capable of creating by multiple contacts at a second pressure, a zone substantially miscible as earlier described with at least a major part of the carbonated residual oil solution. As herein pointed out, the concentration of carbon dioxide in the carbonated oil solution may vary depending on equilibrium or undersaturated conditions between the residual oil and the carbonated water in the reservoir. The second miscible pressure at which the gas will build miscibility with the carbonated oil solution at the reservoir temperature depends in part on the carbon dioxide concentration in the carbonated oil solution and is also subject to the experimental variations mentioned. Therefore, as used herein, the second miscible pressure is the lowest reasonably certain pressure at which the gas will build miscibility with reservoir oil saturated with the maximum concentration of carbon dioxide in the carbonated oil solution that could reasonably be achieved at equilibrium conditions between the reservoir oil and a carbonated water solution at a reservoir pressure used in the process. For this purpose the ratio of carbon dioxide to water in the carbonated water solution will be the maximum value determined from the injection history and will usually be highest shortly before commencement of injection of the gaseous phase since it is desirable for the carbonated residual oil to be richest at this time, and the pressure and concentration of carbon dioxide in the carbonated water will, therefore, be highest at this time. It is particularly important to note that it is essential in this process that the second miscible pressure at which the gas will create miscibility with carbonated oil solution be less than the first miscible pressure at which the gas will create miscibility with the reservoir oil. The gas in the gaseous phase, which may or may not contain some carbon dioxide, will be natural gas or a methane rich gas, flue gas, a nitrogen rich gas, ethane, or some other similar inert gas or mixture of gases, and the richness of the gaseous phase may be adjusted in known ways to enhance development or maintenance of miscibility.

The advantages and objectives of this invention are also accomplished only if at some time during the displacement process the bottomhole injection pressure of the gaseous phase is at least as great as the second miscible pressure and only if during the displacement process the bottomhole injection pressure of the gaseous phase stays below the first miscible pressure. The injection pressure of the gaseous phase will also be below the overburden pressure of the reservoir. Preferably, the bottomhole injection pressure of the gaseous phase will also eventually be at least 200 psi and greater above the bubble point of the residual carbonated oil at reservoir conditions or above the final or highest injection pressure exerted on the carbonated water. At these pressures, the fluid containing the gaseous phase banks up carbonated residual oil as a quasi miscible solvent slug to provide the advantages of a miscible slug process. The quasi solvent slug of carbonated residual oil is gathered and banked up by the fluid containing the gaseous phase at a pressure lower than the pressure at which the gas in the gaseous phase would build miscibility with the reservoir oil by itself.

As previously indicated, there are several interrelated aspects of the process which prescribed conditions for the carbonated water solution and the subsequent gaseous displacing medium. Briefly it has been indicated that a carbonated residual oil phase must be left after passage of the carbonated water and the distribution of this carbonated residual oil phase should be reasonably uniform and widespread. The amount of carbonated residual oil phase should be such that subsequent injection of a gaseous phase can initially build the carbonated residual oil into a quasi solvent-like slug, or bank within a reasonable distance of the injection point and can rebuild the slug bank when and if some of the quasi solvent bank between the gaseous phase and oil is lost. The concentration of carbon dioxide in the residual oil phase should be high enough to allow the gaseous phase to develop a zone miscible with the carbonated oil at a reasonable pressure by the high pressure gas multiple contact method previously described. The miscible zone then banks up carbonated residual as it moves through the formation.

As stated, the distribution of the quasi solvent carbonated residual oil should be generated in a reasonably uniform and widespread manner with improved sweep. The significance of this on the process can best be understood by considering the factors which control sweep. Two factors controlling injection sweep out pattern are variations in permeability including the presence of porous and tight streaks in the reservoir and the geometry of the fraction of the reservoir contacted by an invading fluid. Even if the reservoir were perfectly homogeneous, the fluid flow would streamline toward the producing point and not sweep the total reservoir. For both factors, the sweep out efficiency is primarily controlled by differences in gravity and mobility between the injected fluid and the reservoir fluid. Gravity differences tend to cause gravity override especially when verticle permeability is present. Differences in mobility between the driving fluid and the displaced fluid tend to cause fingering and the geometry of the sweep pattern to streamline quicker and to cause the displacing fluid to break into the producing point. Differences in mobility also increase the tendency of gravity differences to cause the lighter fluid to override. Mobility differences are usually expressed in terms of mobility ratios which are found by dividing the mobility of the drive fluid behind a sweep front by the mobility of the displaced fluid ahead of the front. Mobility is broadly defined as the permeability divided by the viscosity. When the mobility ratio is large, a relatively inefficient sweep occurs A displacing fluid with a mobility of between 0 and 1 times the mobility of the displaced fluid provides a high sweep efficiency. Carbonated water with no significant amount of gaseous carbon dioxide usually provides a mobility ratio of about one and provides a good sweep out pattern. In contrast, a miscible slug process using carbon dioxide gas would have a mobility usually at least ten times that of carbonated water and the sweep out is less. In this method, the quasi solvent carbonated residual oil is to be generated in situ with the high sweep out efficiency of carbonated water flooding so that the quasi solvent is generated in situ in a more widespread reasonably homogeneous or uniform manner throughout the pay zone unless stratification is very severe. This requirement thereby places a restriction on the pressure or the ratio of water to carbon dioxide. As illustrated, a significant free gas carbon dioxide phase would adversely affect the sweep efficiency and uniform placement of the quasi solvent. Consequently, at the anticipated sweep pressure, the amount of carbon dioxide should not exceed the amount that the water can hold in solution. Stated in another way, the ratio of water to carbon dioxide in the solution should be at least as great as the ratio of water to carbon dioxide in a saturated carbonated water solution at the bottomhole pressure at which the water and carbon dioxide are injected into the injection point and at the temperature of the reservoir. This is the maximum saturation pressure since there is a pressure drop in the reservoir. Transfer of carbon dioxide from the carbonated water solution to the residual oil will tend to offset the pressure drop until the oil becomes saturated at equilibrium conditions with the carbonated water. When saturation of the residual oil is anticipated, a mean reservoir pressure instead of the bottom-hole injection pressure is selected for the maximum saturation pressure for the ratio of water to carbon dioxide to avoid formation of a free carbon dioxide gas phase.

As stated, it is also necessary that carbonated residual oil be left in the reservoir after passage of the carbonated water solution. This requirement places the same sort of restrictions on the ratio of water to carbon dioxide as just described. A substantial free carbon dioxide phase would tend to deplete or sweep the residual oil from the displaced area because as previously mentioned, pure carbon dioxide is considered a solvent slug material. Moreover, as will be pointed out, the pressure during the carbonated water injection state of this recovery method will usually be either raised to a pressure or will be at a pressure above the pressure at which pure carbon dioxide would be miscible with the reservoir oil. At this pressure, a free carbon dioxide phase would miscibly sweep the oil from the invaded region; consequently, injection of the water and carbon dioxide will be conducted in a manner and under conditions such that a substantial slug-like amount of free carbon dioxide does not develop in the region where the quasi solvent material is to be generated and does not remove the residual or bypassed oil in this region. As mentioned, it is also desirable to avoid formation of a free carbon dioxide phase for other reasons. For example, channelling or gravity segregation could occur when generating the quasi solvent slug of carbonated residual oil. This would tend to cause less contact of the oil and less carbon dioxide from being transferred to and dissolved in the residual oil. The injection conditions and ratio of water to carbon dioxide are, therefore, such that a substantially stable carbonated water solution at the temperature and pressures encountered is formed and such that, if any carbon dioxide is not dissolved or comes out of solution, the undissolved carbon dioxide will not interfere with the mechanism of the process described herein. When injecting the carbon dioxide and water, the appropriate ratio is selected in accordance with such principles and the purposes of this process.

In addition to the aforementioned need for generating and leaving enough carbonated residual oil to act as a quasi solvent slug, it has been shown that a widespread area of carbonated residual oil is desired and that the desired concentration of carbon dioxide in the carbonated residual oil is to some extent based on the type of gaseous phase subsequently injected and the desired reduction in multiple contact miscible pressure to be achieved by the process. These requirements and desires are, along with other things, dependent on the amount of carbonated water solution injected and the solution pressure.

The amount of carbon dioxide and water introduced into the injection point is such that when the carbon dioxide and water are in solution, the solution generates in situ enough carbonated residual oil solution to maintain miscibility with the subsequently injected gaseous phase throughout a significant portion of reservoir. The quantity of solution to be injected may be calculated and determined by known design and test procedures under simulated conditions. The optimum amount for any particular reservoir application will, of course, be dependent on many variables and allowances. Much has been published on reservoir displacement calculation and design techniques. The amount will be effected by geometry, reservoir temperature, reservoir pressure which will usually be increased during the process, reservoir properties and reservoir fluid properties, the solubility of carbon dioxide in water the pressures and temperature in the reservoir, rate of injection, the properties of the following gaseous phase, the degree of miscibility pressure decrease desired, the amount of oil left in place at the start of the process and left residual to passage of the carbonated water, sweep efficiency, allowances for fingering, length effects, dispersion, dilution and diffusion, mass transfer rates, equilibrium coefficients, phase behavior, and the like. From a consideration of such factors, experience with miscible slug processes, experiments with the process of this invention, and the primary objective of the carbonated solution which is to transfer, preferably at saturated equilibrium conditions between the carbonated water and reservoir oil, carbon dioxide to the residual oil over a large area so that the carbonated residual oil may be miscibly displaced at a lower than normal pressure by a gaseous phase which builds miscibility by multiple contacts between the gaseous phase and the carbonated residual oil, depending on sweep efficiency, the minimum amount of carbonated water solution injected into the reservoir should be at least as great as 10 to 30 percent and more of the pore volume of the reservoir within which the process is practiced.

As previously indicated, the pressure exerted on the carbonated water solution is selected from several viewpoints. The pressure is chosen to avoid formation of a substantial free carbon dioxide phase when generating the quasi solvent material. The injection pressure affects the injection rate which in turn affects the rate at which the reservoir pressure rises, the linear rate of flow of carbonated water in the reservoir, and to some extent the amount of carbonated water solution needed since mass transfer of carbon dioxide into the residual oil is a time dependent process. The longer the flow path or the lower the displacing velocity, the longer is the time for mass transfer. The pressure also affects the rate of mass transfer and the amount of carbon dioxide that can be dissolved in the carbonated water solution. As previously mentioned, the carbon dioxide transfers to bypassed residual oil until equilibrium is reached.

During early stages of the process, injection and reservoir conditions can vary widely between reservoirs and situations. But once a given system and in situ generation of the quasi slug material is from radial and pressure standpoints well underway, the injection ratio of carbon dioxide to water will normally not exceed water saturation conditions. Much has been published on the solubility of carbon dioxide in water which increases with increasing pressure. For temperatures up to 210°F and pressure below 400 atmosphere or 5800 psi, the solubility of carbon dioxide in water decreases with increasing temperature. In general, the solubility of carbon dioxide in water decreases with an increase in salt content in the water. In general, therefore, the amount of carbon dioxide which can be dissolved in water is dependent on the temperature of the reservoir, the purity of the water, and the partial pressure of the carbon dioxide. The temperture is fixed by the temperature of reservoir in the region where the quasi solvent slug is to be generated. The pressure is determined by the pressure of the reservoir, the injection rate and pressure, and a time dependent means pressure in the region where the quasi solvent carbonated residual oil is generated. The water, which is preferably deoxidized, will usually be of the type available in shallow formations near or in the field of the reservoir and will usually be a brine solution. Adjuvants, which will aid the process, could be added. For example, anionic, cationic, nonionic, hydrophilic, or lyophilic surface active agents, viscosity-increasing agents, emulsifiers, and the like, may be added initially or at any stage of the displacement method. In general, the volumetric ratio of water to carbon dioxide at standard conditions of pressure and temperature is at least as great as 1 to 33 and equal to or less than 1 to 6.

In addition to the aforementioned pressure considerations, the final pressure exerted on the carbonated water affects the initial injection pressure for the fluid containing the miscible gaseous phase. It is highly desirable that before the miscible gaseous phase is injected, the bottomhole pressure at the injection point be at least as great as the second miscible pressure previously defined, that is, the pressure at which gas in the gaseous phase will create miscibility with the carbonated residual oil. This pressure level is desired for many reasons, most of which have been previously indicated. There is a minimum pressure at which the gas will develop a miscible zone by multiple contacts with the residual carbonated oil. This minimum pressure depends in part on the concentration of carbon dioxide in the residual oil and as previously explained increasing the pressure exerted on the carbonated water increases mass transfer of the carbon dioxide to the residual oil and can increase the equilibrium concentration of carbon dioxide in the residual oil. Until this minimum pressure is reached, the fluid containing the gaseous phase will immiscibly sweep the reservoir bypassing residual carbonated oil and creating the collateral effects usually involved in immiscible displacements. Optimum sweep or eventual recovery is obtained if the gaseous phase quickly builds the miscible zone and banks up the quasi solvent slug of carbonated residual oil.

Generally, for the carbonated water phase of the process, a mean reservoir pressure is selected and a carbon dioxide solution is injected or created at an appropriate bottomhole injection pressure above the mean reservoir pressure either by injection a carbonated water solution or by injection water and carbon dioxide separately into a well bore in a manner such that the necessary mixing and dissolving of the carbon dioxide in the water will occur in the well bore and/or in the reservoir adjacent to the injection well. This latter procedure contemplates the injection of precalculated portions of chilled or unchilled carbon dioxide and water or undersaturated carbonated water to form the desired carbonated water solution. The carbon dioxide may be liquid, gaseous, or a dense fluid above its critical temperature. The carbon dioxide may be obtained by combustion of methane or other fuel and all or a portion of the carbonated water solution formed above ground by using water to absorb carbon dioxide from the products of combustion. The separated nitrogen could be injected into another area of the field as part of the miscible gaseous fluid. A premixed chilled solution of carbon dioxide in water may also be injected. When carbon dioxide is produced, it may be recycled for reuse in the reservoir or some other reservoir.

As previously indicated, the reservoir process may be carried out in any suitable reservoir whether previously depleted or not and previously water flooded or not, but will usually not be conducted in a reservoir in which a miscible displacement was previously conducted unless for some reason the miscible displacement was grossly unsuccessful and a substantial residual oil saturation is present. Generally, however, the process will be conducted in a depleted reservoir which has been depleted either by natural or artifical means and may be after water flooding. In such a reservoir, there may be a gas phase and the reservoir liquid is usually at a relatively low saturation pressure. In such situations, the oil-bearing formation or reservoir from which oil is to be displaced will first be brought to predetermined conditions. For example, the static pressure at the injection should be at 400 psi before commencement of carbon dioxide-water injection and preferably at least 1000 psi. If the reservoir is not at the desired pressure, the reservoir may easily be brought to desired pressure by fluid injection or water injection. After the reservoir pressure has been raised to the desired pressure, the process may be commenced. Some reservoirs may contain an undesirable amount of methane or the like at a high pressure, and it may probably be more desirable to first produce this formation lowering the methane pressure and the amount of methane dissolved in the crude oil. After the reservoir has been depressured and the methane allowed to escape from the oil, the oil invention may be conducted without repressurization. It may also be desirable to first treat, in ways known to the art, the formation with materials that balance the permeabilities of strata in the reservoir or that reduce the effect of reservoir inhomogenieties.

As already shown, after injection of the carbon dioxide and water, a fluid containing a gaseous phase is injected in an amount sufficient to provide a fluid drive miscible with the quasi solvent carbonated residual oil solvent. Usually, the amount of gaseous phase injected is at least 20 percent or more of the reservoir pore volume. Frequently, the gaseous phase is injected until breakthrough or an excessive gas-oil ratio rise at the production point or points. The actual quantity of gas added to the reservoir will be dependent upon the reservoir and whether or not the miscible gaseous phase is mixed with a liquid such as water. Preferably, at least a portion of the fluid including the gaseous phase will also include an aqueous phase. Injection of water with the miscible gaseous phase, either intermittently or simultaneously to cause a two-phase flow in the reservoir, provides improved results in reservoirs where control of gravity and mobility factors is essential. The reservoir volumetric ratio of water to gaseous phase will range between 10 parts water to 1 part gas and 1 part water to 10 parts gas with the usual range between 1 to 4 and 4 to 1. This ratio is dependent on reservoir characteristics and process conditions as is designed to cause the gaseous phase and aqueous phase to flow at equal rates, or to cause the gaseous phase to flow slightly faster than the water, or to cause the two to flow at rates such that a preceding miscible gas slug or slugs is not depleted. U.S. Pat. No. 3,096,821 mentions the principles involved.

It is particularly advantageous and useful in this process to make the first part of the aqueous phase carbonated water. As previously noted, the gaseous phase builds miscibility with carbonated residual oil solution. In other words, the fluid containing the gaseous phase is initially immiscible with carbonated oil. If noncarbonated water were injected with the gaseous phase, transfer of carbon dioxide to the injected water might in some situations prolong the distance before the miscible zone is formed. Use of a carbonated aqueous phase also supplies additional carbon dioxide transfer to the oil as the sweep pattern expands or if miscibility needs to be reestablished. It is usually unnecessary to use carbonated water throughout injection of the gaseous phase. The injected water will bank up water already in the reservoir. Therefore, as a practical matter, the carbonated portion of the aqueous phase will usually be less than 20 percent of the reservoir pore volume.

Preferably, throughout at least the latter part of the carbonated water phase and at least the first half of the fluid injection phase of the process, the pressure exerted on the carbonated water and gaseous phase will be maintained or increased. During the carbonated water phase, this prevents substantial vaporization of carbon dioxide from the carbonated water and residual oil, and during the gaseous injection phase, this either builds and maintains or simply maintains miscibility between the gaseous phase and the quasi solvent carbonated residual oil. For various reasons, production rates and other factors prevent maintenance of the desired pressure throughout the reservoir. The method of this invention still provides for improved recovery and for recreation of miscibility when the pressure can be restored.

As the process is carried out, oil is produced from the reservoir through one or more production wells arranged in a pattern depending on the reservoir characteristics and operating systems. Production may be shut in or retarded when desired.

The process is readily adaptable to any reservoir at any stage of depletion containing oil suitable for dissolving carbon dioxide and building miscibility with a gaseous phase at a reasonable pressure below the overburden pressure. The process is most readily applied on a field-wide basis wherein the reservoir is traversed by several well bores. The wells may be arranged in a conventional manner such as an open or closed five spot, seven spot, or line pattern, or as the individual situation demands, with certain of the well being used for injection of the displacement media and others for production of the hydrocarbons.

Example

A synthetic Boise Core initially saturated with oil from Wasson Field, West Texas was subjected to injection of 6 pore volumes of carbonated water which was slightly undersaturated at 2000 psig and 109°F until oil production had nearly ceased and the producing carbonated water contained at least 93 percent of the injected carbon dioxide concentration. The carbonated water contained 4.5 pounds of carbon dioxide per 100 pounds of water. During carbon dioxide injection, the composition of the effluent water was monitored. Initially, the carbon dioxide concentration in the effluent water was low, indicating transfer of carbon dioxide from the carbonated water to be residual oil. After carbonated water flooding, the core was subjected to methane injection at the same conditions, and 27 percent by volume of the oil residual to carbonated water flooding was produced. Swelling of oil could not account for the increased oil production because in previous Boise Core experiments, it had been shown that methane injection at double this injection pressure would only produce 5 percent of oil residual to water flooding. The swelling of oil by methane at 4000 psig is the same as swelling by carbon dioxide at 2000 psig. The carbonated water-methane displacement, therefore, significantly increased residual oil production. In other Boise Core experiments, it had been determined that the miscible pressure between carbon dioxide and Wasson oil at 109°F was between 1350 and 1500 psig, and that the miscible pressure between methane and Wasson oil at 109°F was estimated to be above 5000 psig. This experiment and others indicate that Wasson oil having a composition like that produced by carbonation as described above will be substantially miscible with methane at pressures around 2000 psig.

Reasonable variations and modifications are practical within the scope of this disclosure without departing from the spirit and scope of the claims of this invention.

The embodiments of the invention in which an exclusive property or privilege is claimed are defined as follows:

1. A method of recovering oil from a subterranean reservoir wherein there is at least one injection point and one production point, said points being spaced one from the other, which method comprises:
   a. injecting water and carbon dioxide into said injection point at a bottomhole pressure sufficient to force a carbonated water solution through at least a portion of said reservoir between said injection and said production points and to form a zone of carbonated oil solution in said portion of said reservoir, the ratio of water to carbon dioxide being at least as great as the ratio of water to carbon dioxide in a saturated carbonated water solution at said bottomhole pressure and at the temperature of said reservoir;
   b. thereafter injecting a fluid including a gaseous phase into said injection point, the gas in said gaseous phase being capable at the said reservoir temperature of creating at a first miscible pressure a zone substantially miscible with said reservoir oil and of creating at a second miscible pressure, a zone substantially miscible with at least a part of said carbonated oil solution, said second miscible pressure being less than said first miscible pressure, said gaseous phase being injected at a bottomhole pressure below said first miscible pressure and at least a portion of said gaseous phase being injected at a bottomhole pressure greater than said second miscible pressure; and
   c. producing oil from said reservoir from said production point.

2. The method of claim 1 wherein the fluid including a gaseous phase also includes an aqueous phase.

3. The method of claim 2 wherein the aqueous phase is a carbonated water solution.

4. The method of claim 1 wherein before the fluid including the gaseous phase is injected, the bottomhole pressure at the injection point is at least as great as the second miscible pressure.

5. The method of claim 4 wherein the fluid including a gaseous phase also includes an aqueous phase.

6. The method of claim 5 wherein the aqueous phase is a carbonated water solution.

7. The method of claim 4 wherein at least a portion of the gaseous phase is injected at a bottomhole pressure at least 200 psi higher than the highest bottomhole pressure reached during step (a) at said injection point.

8. The method of claim 7 wherein the fluid including a gaseous phase also includes an aqueous phase.

9. The method of claim 8 wherein the aqueous phase is a carbonated water solution.

10. The method of claim 1 wherein at least a portion of the gaseous phase is injected at a bottomhole pressure at least 200 psi higher than the highest bottomhole pressure reached during step (a) at said injection point.

11. The method of claim 10 wherein the fluid including a gaseous phase also includes an aqueous phase.

12. The method of claim 11 wherein the aqueous phase is a carbonated water solution.

13. The method of claim 1 wherein the amount of the water and carbon dioxide introduced into the injection point in such that when the carbon dioxide and water are in solution, the solution is at least as great as 10 percent of the pore volume of the reservoir.

14. The method of claim 13 wherein the fluid including a gaseous phase also includes an aqueous phase.

15. The method of claim 14 wherein the aqueous phase is a carbonated water solution.

16. The method of claim 13 wherein before the fluid including the gaseous phase is injected, the bottomhole pressure at the injection point is at least as great as the second miscible pressure.

17. The method of claim 16 wherein the fluid including a gaseous phase also includes an aqueous phase.

18. The method of claim 17 wherein the aqueous phase is a carbonated water solution.

19. The method of claim 16 wherein at least a portion of the gaseous phase is injected at a bottomhole pressure at least 200 psi higher than the highest bottomhole pressure reached during step (a) at said injection point.

20. The method of claim 19 wherein the fluid including a gaseous phase also includes an aqueous phase.

21. The method of claim 20 wherein the aqueous phase is a carbonated water solution.

22. The method of claim 13 wherein at least a portion of the gaseous phase is injected at a bottomhole pressure at least 200 psi higher than the highest bottomhole pressure reached during step (a) at said injection point.

23. The method of claim 22 wherein the fluid including a gaseous phase also includes an aqueous phase.

24. The method of claim 23 wherein the aqueous phase is a carbonated water solution.

* * * * *